United States Patent [19]

Meiller

[11] Patent Number: 4,558,902
[45] Date of Patent: Dec. 17, 1985

[54] TRAVEL SEAT

[75] Inventor: Hermann Meiller, Amberg, Fed. Rep. of Germany

[73] Assignee: Messrs. Willibald Grammer, Fed. Rep. of Germany

[21] Appl. No.: 531,830
[22] PCT Filed: Jan. 18, 1983
[86] PCT No.: PCT/EP83/00009
 § 371 Date: Aug. 12, 1983
 § 102(e) Date: Aug. 12, 1983
[87] PCT Pub. No.: WO83/02550
 PCT Pub. Date: Aug. 4, 1983

[30] Foreign Application Priority Data

Jan. 21, 1982 [DE] Fed. Rep. of Germany ....... 3201650

[51] Int. Cl.⁴ .................. A47C 1/024; A47C 7/14; A47C 7/46
[52] U.S. Cl. ........................... 297/284; 297/319
[58] Field of Search ............. 297/61, 68, 145, 154, 297/155, 162, 194, 284, 458, 400, 319

[56] References Cited

U.S. PATENT DOCUMENTS

| 1,271,636 | 7/1908 | Walton | 297/319 |
| 2,489,861 | 11/1949 | Ciraola | 297/145 |
| 2,518,381 | 8/1950 | Runkles | 297/145 |
| 2,655,197 | 10/1953 | Schofield | 297/319 |
| 3,598,442 | 8/1971 | Miller | 297/162 |
| 3,717,375 | 2/1973 | Slobodan | 297/154 X |
| 3,929,374 | 12/1975 | Hogan et al. | 297/61 |
| 3,938,858 | 2/1976 | Drabert et al. | 297/284 |
| 4,040,661 | 8/1977 | Hogan et al. | 297/284 |
| 4,362,336 | 12/1982 | Zapf et al. | 297/61 X |

FOREIGN PATENT DOCUMENTS

| 2026929 | 12/1970 | Fed. Rep. of Germany | 297/319 |
| 2723148 | 11/1978 | Fed. Rep. of Germany | 297/162 |
| 36146 | 4/1930 | France | 297/145 |
| 680482 | 5/1930 | France | 297/319 |
| 599784 | 11/1959 | Italy | 297/162 |
| 609684 | 9/1960 | Italy | 297/162 |
| 12987 | of 1907 | United Kingdom | 297/162 |
| 456391 | 11/1936 | United Kingdom | 297/145 |

Primary Examiner—William E. Lyddane
Assistant Examiner—Peter R. Brown
Attorney, Agent, or Firm—Louis E. Marn

[57] ABSTRACT

In a travel seat comprising a backrest, at least one armrest and a seat cushion, there is provided a support plate member which, disposed at the front end of the armrest in a horizontal position is pivotal in its horizontal plane about a vertical axis and, in the position in which it is swung out, is rotatable about a horizontal axis and can be swung in under the armrest.

2 Claims, 11 Drawing Figures

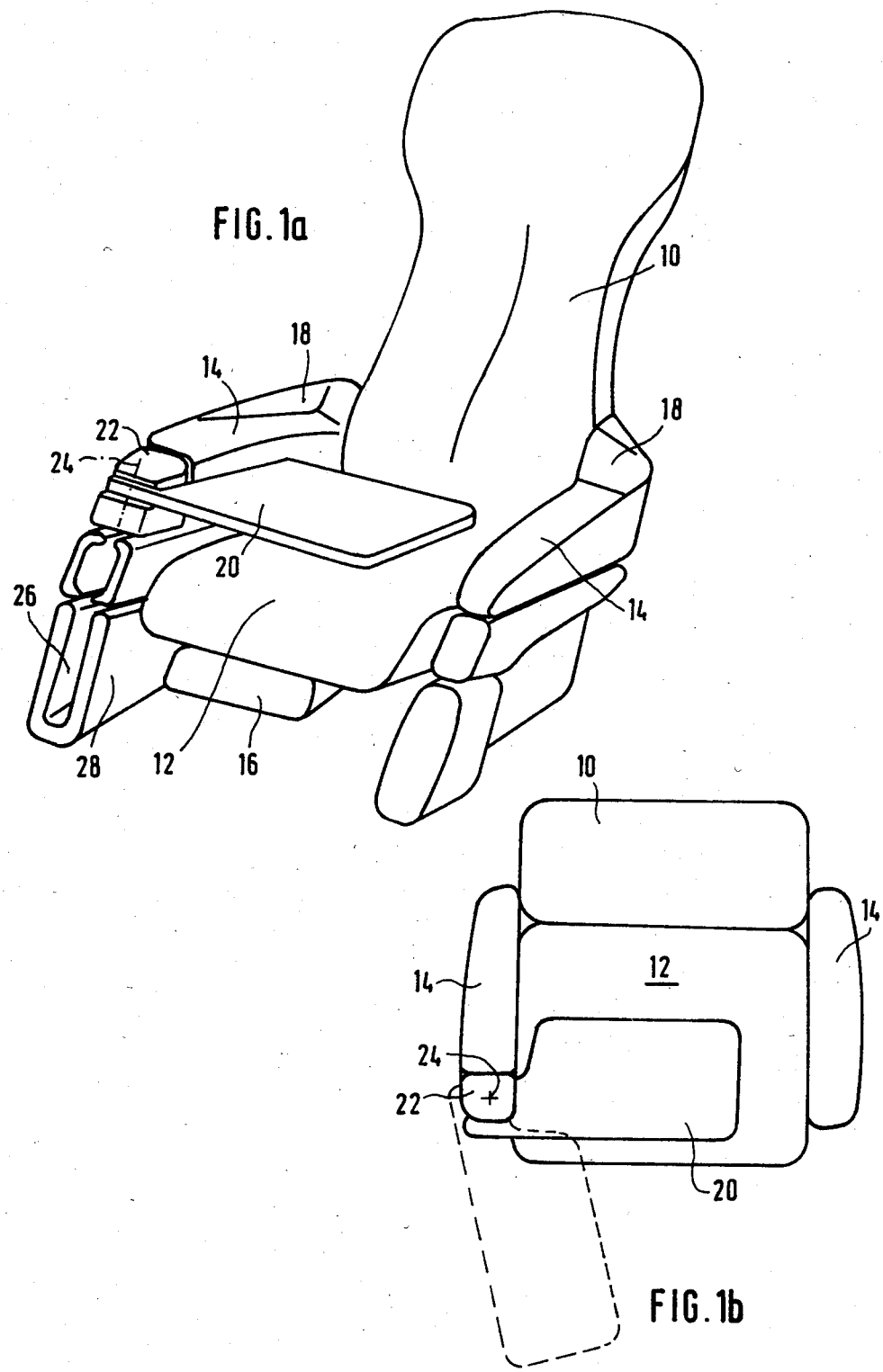

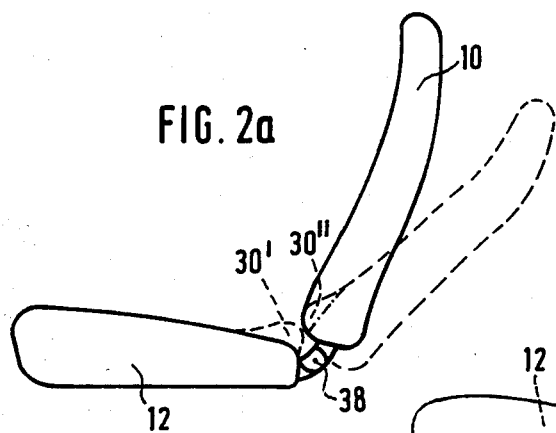
FIG. 2a
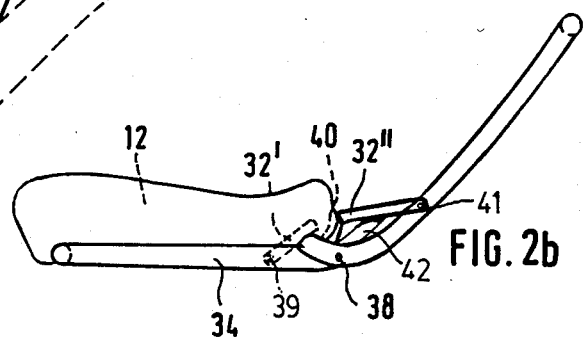
FIG. 2b
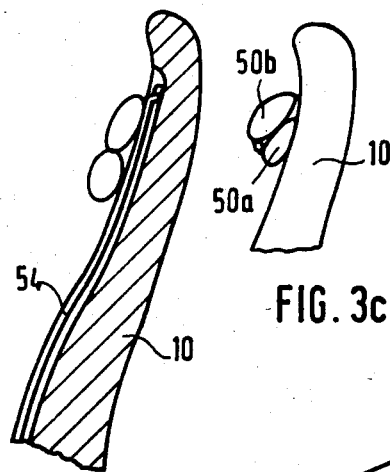
FIG. 3b
FIG. 3c
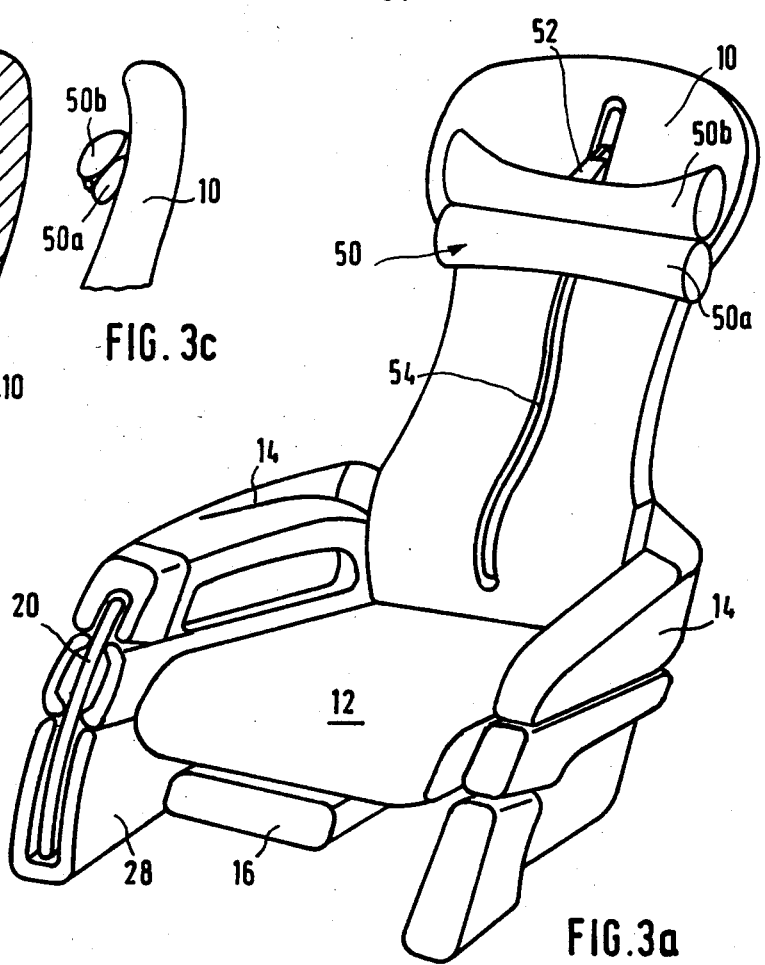
FIG. 3a

TRAVEL SEAT The invention relates to a travel seat as may be used for example in trains, buses and aircraft.

The invention is therefore based on the problem of so designing a travel seat of the kind referred to, that particular account is taken of the problems which specifically occur in such means of transport, and also the desire to carry the passenger in the maximum comfort.

The features set forth in the claims contribute to solving that problem.

Figure 4:
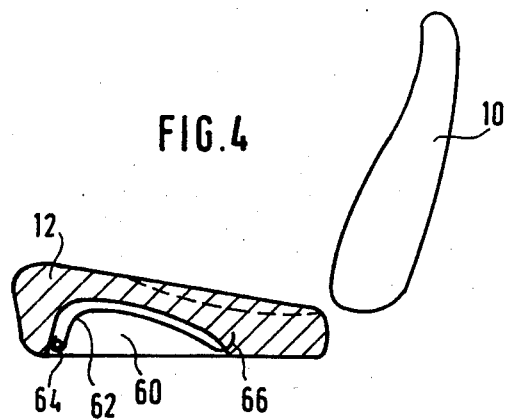
Figure 5A:
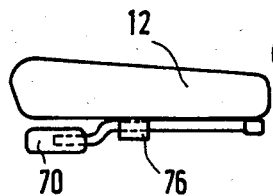
Figure 5B:
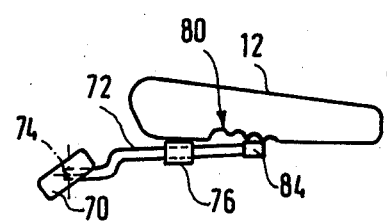
Figure 5C:
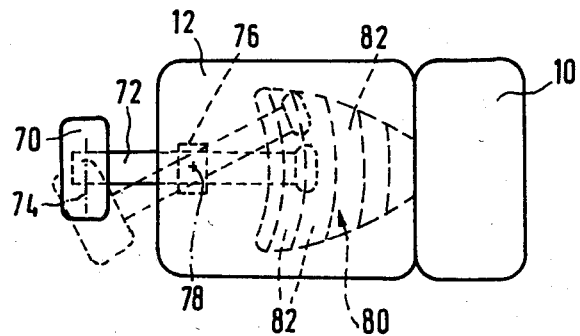

Further advantages, details and features of the invention will be apparent from the following description of preferred embodiments, with reference to the accompanying drawings in which:

FIGS. 1a and 1b show a perspective view and a plan view of a first embodiment of a travel seat having a support plate member, FIGS. 2a and 2b show diagrammatic side views of a second embodiment of a travel seat having an adjustable backrest, FIGS. 3a through 3c show a third embodiment of a travel seat having an adjustable seat cushion, FIG. 4 is a diagrammatic side view of a fourth embodiment of a travel seat with automatic adaptation to different seated or lying positions, and FIGS. 5a through 5c are diagrammtic views of a fifth embodiment of a travel seat having an adjustable footrest.

The travel seat shown in FIGS. 1a and 1b has a backrest 10, a seat cushion 12, armrests 14 and an extendible footrest 16. The backrest 10 which is extended into the head region of the person occupying the seat is narrower in its middle region than in its upper and lower regions, thereby enhancing the freedom for movement of the arms of the person occupying the seat.

In addition, as can be seen from FIG. 1a, the armrests have a wall portion 18 which extends around the arms resting on the armrest, in the region of the elbows thereof. The wall portion 18 on the one hand improves the support for the elbows resting on the armrests, and on the other hand, protects the elbows from being struck from the outside by people walking past the seat.

Also secured to one armrest 14 is a support plate member 20, as can be seen from the drawing. The support plate member 20, which is substantially rectangular is provided at one corner with a projection portion with which it is mounted in a front end portion 22 of the armrest, pivotally about a vertical axis 24, when in the horizontal position shown in the drawing. The plate member 20 can therefore be pivoted from the position in which it is swung in, as shown in solid lines, and in which it is directly in front of the stomach of the person occupying the seat, in a direction away from the seat, into the position shown in broken lines in FIG. 1b and in which the person occupying the seat can leave the seat. As however the support plate member is not required on a continuous basis, it is also provided that the support plate member 20 can be caused to disappear. That is achieved by the front end portion 22 being secured to the armrest 14 pivotally about a horizontal axis which extends in the longitudinal direction of the armrest 14, so that the support plate member 20, when in the position in which it is swung away, can be turned out of the horizontal plane into a vertical plane in which it can then be pivoted about the axis 24 of the front end portion 22, to a position under the armrest 14, through a slot 26 in a side portion, which is formed as a housing 28, of the travel seat. In that connection, the arrangement includes a securing means for preventing the front end portion of the armrest from pivoting about the horizontal axis when the support plate member is in the horizontal position of being swung in. The support plate member 20 is moved out of the housing 28 into the position shown in solid lines in the drawing, in the reverse sequence of movements.

FIGS. 2a and 2b show diagrammatic views of another embodiment of the travel seat. In this embodiment, the angle of inclination of the backrest 10 is adjustable such that the person occupying the seat can to a certain extent occupy a lying position. Tests have shown that, when taking up a lying position, the buttocks of the person occupying the seat slip forwardly and away from the backrest, particularly when the occupant of the seat would like to lie on the side, so that the body of the occupant of the seat extends across the corner or angle between the seat cushion and the backrest, without being supported. Now, the embodiment which will be described hereinafter provides support in that region, such support being operative only in the lying position and being inoperative in the sitting position when the backrest is set at a relatively steep angle. In that way, the degree of comfort of the travel seat is substantially enhanced.

In FIG. 2a, solid lines are used to denote the seat cushion and the upholstered backrest 10 in a sitting position in which the above-mentioned support effect does not occur. However, broken lines are used to denote the shapes of the seat cushion and the upholstered backrest when the seat is in a reclining position in which the above-mentioned support effect occurs. In this connection, attention is directed to reference numerals 30' and 30" in FIG. 2a, which denote an outwardly curved portion of the respective cushions at the ends which are disposed opposite to each other.

Now, those curved portions are produced by means of flaps 32' and 32", one flap 32' being arranged on a carrier means 34 for the seat cushion 12 and the other flap 32" being arranged on a carrier means 36 for the backrest 10. The flaps are each pivotal out of the plane of the respective cushion about an axis 39, 41 which extends in the direction of the width of the seat, the free ends thereof being directed towards each other, and act from below and from the rear respectively, on the underside of the respective seat cushion, in order to lift it up. A raising or pivotal movement of the flaps in order to produce the curved configurations 30' and 30" is positively achieved in a simple, clever fashion by the backrest carrier means 36 automatically acting from below on the flap 32' of the seat cushion carrier means 34, and lifting same, upon pivotal movement of the backrest in a rearward direction, by means of an extension portion 40 which projects beyond the pivot axis 38 of the backrest carrier means and which is bent towards the seat cushion 12. At the same time, an extension portion 42 of the seat cushion carrier means 34, which is bent towards the backrest and which projects beyond the pivot axis 38, automatically acts on the underside of the flap 32" of the backrest carrier means, upon pivotal movement of the backrest, so that the flap of the backrest carrier means is raised thereby. That mechanism can be clearly seen from FIG. 2b. That mode of operation therefore produces the curved configurations 30' and 30" which fill the angle between the backrest and the seat cushion, when the seat is in the reclining position.

A pillow or cushion 50 which can be used in many ways is shown in FIGS. 3a through 3c, FIG. 3a moreover showing the support plate member 20 of FIGS. 1a and 1b in its position in which it is not in use. In the direction of the height of the backrest, the cushion 50 is divided into two portions 50a and 50b which can be folded over against each other, as can be clearly seen from the drawing. The upper portion 50b is of a concave configuration in an upward direction, in order to provide lateral support for the head.

The cushion 50 is adjustable over virtually the entire height of the backrest, as shown in FIG. 3a, and it is secured by its upper portion 50a to a flexible or stretchable connecting member 52 which extends through a slot 54 on the top side of the backrest, the slot extending in the direction of the height of the backrest, and which is secured against being removed from the backrest 10, on the back of the slot, by a holding and guide member, in such a way that the cushion can be fixed at different heights. Heightwise adjustment of the cushion has the advantage that not only can it be adapted as a head support, to any size of person occupying the seat, including in particular small children, but it can also be used as a intervertebral disc support or as an additional support in the pelvic region. In addition, the head cushion can also be displaced sideways and possibly rotated so that in the reclining position (see the construction shown in FIGS. 2a and 2b, it can be suitably positioned to meet the individual wishes of the person occupying the seat. Forming the cushion as two portions which can be folded over relative to each other has the advantage that, in the sitting position, the cushion is presented in a very flat or shallow form, to allow greater freedom of movement of the head, while in the reclining position, a thicker cushion is available for filling up the space behind the neck and to provide lateral support. FIG. 3c shows the portions 50a and 50b in the position in which they are folded over, in which connection it should be noted that the cushion is maintained in that position simply by the pressure of the portion 50b or the head against the portion 50a. The cushion 50 is connected to the connecting member 52 only at the upper transverse edge of the portion 50b thereof. FIG. 3b provides an even better view of the slot 54 in the backrest 10. Finally, it should also be pointed out that the cushion 50 is theft-proof, as it cannot be removed from the backrest.

FIG. 4 shows another embodiment wherein the seat cushion has a hollow space or cavity 60 which is curved or arched in the longitudinal direction of the seat and in which a correspondingly curved leafspring 62 is arranged. At the front end 64, the leafspring 62 is held immovably while it is mounted displaceably at its rear end 66. That arrangement, as shown in FIG. 4, has the advantage that the seat cushion automatically adapts to the positions occupied by the person using the seat, more specifically, in respect of the depth of the seat and the inclination of the seat in the buttock area. By virtue of that arrangement, good support is provided precisely when the occupant of the seat is in a reclining position as it prevents the buttocks from slipping forwardly, in a sitting position, as shown for example in broken lines in FIGS. 2a and 2b. In conjunction with the construction shown in FIGS. 2a and 2b, in the embodiment shown in FIG. 4, an optimum reclining position is provided, in which, although the occupant of the seat cannot recline in a horizontal position, which is not possible from the outset, due to the amount of space required, nonetheless the person can rest in a pleasant, reclining position, with the body having excellent support in all regions thereof.

FIGS. 5a through 5c show a particularly advantageous arrangement for a footrest for a travel seat. The footrest is secured to the underside of the seat cushion 12 so that the space under the seat cushion in the region of the floor is free and the occupant of the seat can put his feet under the cushion, which the occupant of the seat finds comfortable. The actual footrest 70 is a substantially horizontally disposed elongate plate which extends in the transverse direction and which is considerably narrower than the width of the seat. By virtue of that arrangement, even in the extended position as is shown for example in FIGS. 5b and 5c, the occupant of a neighbouring seat can easily step over the footrest, and the occupant of the seat himself can easily leave the seat as the occupant's feet can then be put on the floor beside the footrest.

The footrest 70 is secured to the front end of a footrest support arm 72 which extends in the longitudinal direction of the seat, and is pivotal about a horizontal transverse axis (see FIGS. 5b and 5c). The carrier arm 72 is mounted displaceably in its longitudinal direction in a mounting and guide member 76 which embraces it and which in turn is secured to the underside of the seat cushion pivotally about a vertical axis 78 so that not only can the footrest 70 be pushed in completely under that seat (see FIG. 5a) and pulled out of that position (see FIG. 5b) but in addition, in the extended position or in an intermediate position, can be pivoted sideways about the vertical rotary axis 78 so that, in spite of the narrow width of the footrest 70, the occupant of the seat, when in a reclining position, can comfortably support the feet on the footrest, in a lateral position.

The end of the carrier arm 72 which is remote from the footrest 70 engages into a slide means 80 which advantageously plastic material and which can be more clearly seen from FIGS. 5b and 5c. The slide means 80 which is disposed on the underside of the seat cushion 12 is a concavely curved plate which tapers inwardly in a rearward direction and in which are formed transversely extending, arcuate grooves. The end of the carrier arm which is remote from the footrest 70 is guided in the grooves, upon pivotal movement of the footrest in a sideways direction. In this arrangement, the different lengths of extension of the footrest are determined by the spacing 82 between the grooves, while the carrier arm 72 which is tiltable in a vertical direction, with a certain amount of play, must be lifted a little at the end at which the footrest is disposed, so that the end 84 thereof can pass over the raised portions between the grooves. The end 84 is held in the grooves themselves by the weight of the footrest 70 or by the pressure of the feet on the footrest.

As the drawings also show, the further out that the footrest is extended, the greater is the possible range of pivotal movement in a sideways direction. In the fully retracted condition, by virtue of the centering effect produced by the slider means 80, the footrest is always in the central position so that it can be easily found at any time by putting a hand under the seat to grip the footrest. In addition, the further out that the footrest is extended, the greater is the angle of tilting movement of the carrier arm 72 and the lower therefore is the position at which the footrest 70 can be set, for the larger the occupant of the seat, the greater must be the degree to which the footrest 70 is extended outwardly and the lower must be the position in which the footrest comes to lie, relative to the seat cushion. Finally, however by virtue of the curved configuration of the slider means, the angle of tilting of the footrest arrangement decreases continuously upon pivotal movement of the footrest towards the side so that the footrest is raised upon pivoting towards the side, and that also corresponds to anatomical considerations insofar as, when an occupant of the seat is in a S-shaped position, when in a reclining condition, the feet of the occupant are at a higher level, the more that the occupant of the seat lies towards the side so that the feet are also moved further towards the side, outwardly of the seat.

With the above-described embodiments of the travel seat, in particular the S-like position which in fact is readily assumed by people when reclining in a non-horizontal position is to be borne in mind, and the travel seat according to the invention substantially takes that into consideration.

I claim:

1. A travel seat comprising a seat cushion, a seat cushion carrier, a backrest cushion and a backseat cushion carrier pivotally mounted relative to the seat cushion carrier and further including a flap pivotally mounted to said seat cushion carrier in a region thereof proximate said backrest cushion carrier means for movement about an axis extending transversely with said seat cushion carrier, said backrest cushion carrier including a member to positively engage said flap of said seat cushion carrier upon rearward pivotal movement of said backrest cushion carrier means to cause said flap to pivot out of said seat cushion carrier.

2. The travel seat as defined in claim 1 and further including a flap pivotally mounted to said backrest cushion carrier in a lower region thereof for movement about a transverse axis to said backrest cushion carrier, said seat cushion carrier including a member to positively engage from below said flap of said backrest cushion carrier upon rearward pivotal movement of said backrest cushion carrier to cause said flap of said backrest cushion carrier to pivot out of said backrest cushion carrier.

* * * * *